(12) United States Patent
Schmauder et al.

(10) Patent No.: US 12,502,744 B2
(45) Date of Patent: Dec. 23, 2025

(54) CHANGEOVER APPARATUS FOR CHANGING BETWEEN AT LEAST TWO WORKPIECE SUPPORTS FOR A MACHINING MACHINE

(71) Applicant: TRUMPF Werkzeugmaschinen SE + Co. KG, Ditzingen (DE)

(72) Inventors: Frank Schmauder, Metzingen (DE); Carsten Knobel, Wilthen (DE); Philipp Nieding, Stuttgart (DE); Uwe Kupferschmidt, Schirgiswalde (DE); Patrick Wowtscherk, Neschwitz (DE); Robert Witte, Lossatal (DE); Niclas Sjödin, Bautzen (DE); Jürgen Brandt, Ditzingen (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 532 days.

(21) Appl. No.: 17/958,514

(22) Filed: Oct. 3, 2022

(65) Prior Publication Data

US 2023/0055482 A1 Feb. 23, 2023

Related U.S. Application Data

(63) Continuation of application No. PCT/EP2021/058359, filed on Mar. 30, 2021.

(30) Foreign Application Priority Data

Apr. 1, 2020 (EP) ..................................... 20167483

(51) Int. Cl.
*B23Q 7/14* (2006.01)
*B23K 26/38* (2014.01)

(52) U.S. Cl.
CPC ............ *B23Q 7/1431* (2013.01); *B23K 26/38* (2013.01)

(58) Field of Classification Search
CPC ... B23Q 1/26; B23Q 1/40; B23Q 1/42; B23Q 1/56–585; B23Q 1/74; B23Q 5/22;
(Continued)

(56) References Cited

U.S. PATENT DOCUMENTS 3,822,059 A * 7/1974 Friedel .................. B23Q 5/385
266/77
4,626,299 A * 12/1986 Knight ................... B24B 41/02
384/42
(Continued)

FOREIGN PATENT DOCUMENTS

CN 101519163 A 9/2009
CN 202114401 U * 1/2012
(Continued)

*Primary Examiner* — Tyrone V Hall, Jr.
(74) *Attorney, Agent, or Firm* — Laurence A. Greenberg; Werner H. Stemer; Ralph E. Locher

(57) ABSTRACT

A changeover apparatus for changing between workpiece supports for a machining machine. The changeover apparatus has a base frame with a carrier apparatus for the workpiece supports, which are vertically movable by the carrier apparatus, with the result that one of the workpiece supports can be transferred into a working plane in which the workpiece support is moved from the carrier apparatus into the machining machine and guided out therefrom. A lifting apparatus acts between the base frame and the carrier apparatus and by way of which the carrier apparatus can be vertically moved relative to the base frame for one workpiece support to take up a first lifting position or a further lifting position in the working plane. The lifting apparatus contains a slotted guide, which movably actuates the carrier
(Continued)

apparatus with the workpiece supports together between the first lifting position and the further lifting position.

19 Claims, 4 Drawing Sheets

(58) Field of Classification Search
CPC .......... B23Q 5/34; B23Q 5/341; B23Q 7/005; B23Q 7/1431; B23K 37/0408; B23K 37/0461; B23K 37/0235; B25H 1/18; B65G 47/52; B65G 47/60; B65G 47/61; B66F 7/06–065

See application file for complete search history.

(56) References Cited

U.S. PATENT DOCUMENTS

| | | | |
|---|---|---|---|
| 4,712,653 A | * | 12/1987 | Franklin .................. B66F 7/08 |
| | | | 187/269 |
| 5,791,864 A | | 8/1998 | Mosca |
| 7,731,013 B2 | | 6/2010 | Milner et al. |
| 10,307,875 B2 | | 6/2019 | Schmauder |

FOREIGN PATENT DOCUMENTS

| | | | |
|---|---|---|---|
| CN | 203751544 U | | 8/2014 |
| CN | 105312912 A | | 2/2016 |
| CN | 106862781 A | | 6/2017 |
| CN | 206662560 U | | 11/2017 |
| CN | 208600965 U | | 3/2019 |
| DE | 102016117681 A1 | | 3/2018 |
| EP | 0457104 A1 | | 11/1991 |
| JP | S6078244 U | * | 5/1985 |
| JP | H06198483 A | | 7/1994 |
| JP | 2001054835 A | * | 2/2001 |

\* cited by examiner

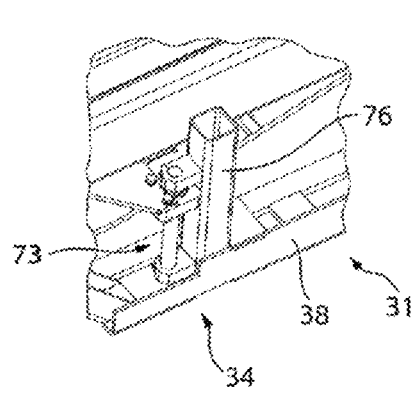 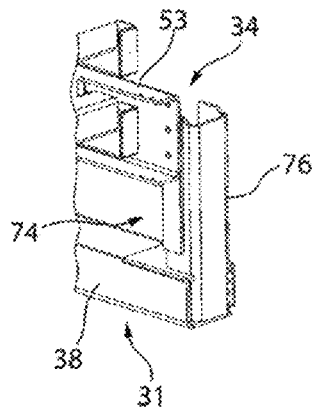
Fig. 7     Fig. 8
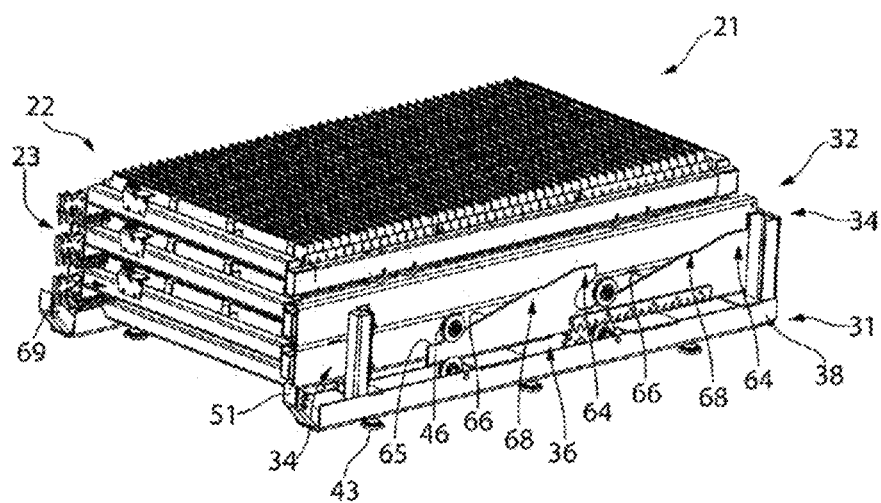
Fig. 9
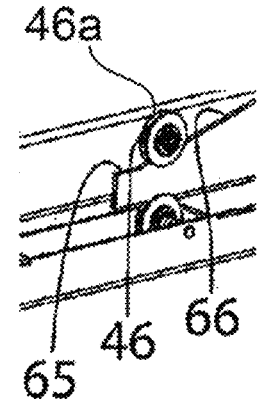
Fig. 9A

CHANGEOVER APPARATUS FOR CHANGING BETWEEN AT LEAST TWO WORKPIECE SUPPORTS FOR A MACHINING MACHINE

CROSS-REFERENCE TO RELATED APPLICATION

This application is a continuation, under 35 U.S.C. § 120, of copending International Patent Application PCT/EP2021/058359, filed Mar. 30, 2021, which designated the United States; this application also claims the priority, under 35 U.S.C. § 119, of European Patent Application EP 20167483.5, filed Apr. 1, 2020; the prior applications are herewith incorporated by reference in their entirety.

FIELD AND BACKGROUND OF THE INVENTION

The invention relates to a changeover apparatus for changing between at least two workpiece supports for a machining machine, in particular a laser cutting machine, which can alternately be moved into and guided out of the machining machine.

Published, non-prosecuted German patent application DE 10 2016 117 681 A1, corresponding to U.S. Pat. No. 10,307,875, discloses a changeover apparatus for changing between at least two workpiece supports for a laser cutting machine for machining plate-shaped workpieces. This changeover apparatus, which is also referred to as pallet changer, contains a base frame, which has a carrier apparatus for at least two workpiece supports. The carrier apparatus is vertically movable, with the result that one of the workpiece supports can be transferred into a working plane in which the workpiece support can be moved from the carrier apparatus into the machining machine and guided out therefrom. A lifting apparatus, by way of which the carrier apparatus is vertically movable relative to the base frame from a first lifting position into at least one further lifting position so that at least the one workpiece support can be arranged in the working plane, is provided between the base frame and the carrier apparatus.

The lifting apparatus may be implemented by hydraulic cylinders, by a ball screw drive, a roller chain drive, an electric cylinder, or linear motors. Such lifting apparatuses have proven successful in practice, but they are costly on account of the number of structural components.

European patent EP 0 457 104 A1 discloses a tool changeover table for a flame cutting machine, with at least two pallets which are alternately transported into the working area of the flame cutting machine. In this respect, during the transport, one pallet is lowered to a plane below the other pallet, after which the one lowered pallet is displaced below the other pallet, which is located in the working plane. At the end of the transporting movement, the pallet displaced in the working plane is guided out of the working area of the flame cutting machine, and the other pallet is lifted and transferred into the working area of the flame cutting machine again. Slotted link disks, which can be moved horizontally along a base frame, have inclined planes as running surface that are arranged in a V shape in relation to one another and serve to lift and lower the pallet, are provided for lifting and lowering the one pallet that is moved below the other. These V-shaped depressions in the slotted link disk are upwardly open.

SUMMARY OF THE INVENTION

The invention is based on the object of proposing a changeover apparatus for changing between at least two workpiece supports for a machining machine, which enables a simple structure for changing between the workpiece supports reliably in terms of the process.

This object is achieved by a changeover apparatus which contains a lifting apparatus with at least one slotted guide, which is horizontally movable and movably actuates the carrier apparatus with the at least two workpiece supports simultaneously between at least two lifting positions relative to the base frame. This changeover apparatus makes it possible for the carrier apparatus to be movably actuated between at least two lifting positions merely by a lifting movement in a vertical direction, with the result that, in each of the lifting positions, a workpiece support is transferred into a working plane in which said workpiece support can be moved into and guided back out of the machining machine. Moreover, such a changeover apparatus has the advantage of having a short longitudinal extent. By actuating the carrier apparatus only with the vertical lifting and lowering movement by means of the at least one slotted guide, the movement is simplified and thus the process reliability is increased.

Advantageously, a respective slotted guide is provided on either side of the carrier apparatus. This makes it possible to provide a simple structure along with synchronous actuation of the movement of the slotted guide.

To perform a lifting movement of the carrier apparatus, at least two carrier rollers are provided on the base frame and at least two running rollers are provided on the carrier apparatus, the at least one plate-shaped slotted guide being arranged and guided movably between the carrier rollers and the running rollers. In this way, the lifting movement between the at least two lifting positions can be realized cost-effectively without hydraulics and with few components. Moreover, the production of a plate-shaped slotted guide is cost-effective.

The carrier rollers and the running rollers preferably have a guide contour, which guides the plate-shaped slotted guide between the carrier rollers and the running rollers, in their respective running surface. Advantageously, the guide contour may be formed by a U-shaped or groove-shaped depression. As a result, a respective lateral annular collar of the running roller and of the carrier roller engages around an outer side of the plate-shaped slotted guide. Such a configuration of the running rollers and carrier rollers is enough to guide the plate-shaped slotted guide in an upright arrangement in between them, with the result that further guide devices on the base frame of the changeover apparatus are not necessary.

Furthermore, the carrier rollers and the running rollers are preferably arranged perpendicularly with respect to the movement direction of the slotted guide in a common plane and preferably have a lateral position deviation of less than 1 mm. This provides a statically stable arrangement. Moreover, lateral displacement forces which could act on the slotted guide are eliminated. The running rollers assigned to the carrier rollers are preferably arranged substantially vertically above the carrier rollers.

A drive element, which interacts with a complementary drive element, is provided on at least one slotted guide, preferably on each slotted guide, of the lifting apparatus, one of the two drive elements being actuated by a drive motor. These drive elements make it possible to easily actuate the movement of the slotted guides along the base frame. For example, a toothed wheel or a toothed pinion and a toothed rack that interact with one another may be provided as drive elements.

The slotted guides preferably arranged on either side of the carrier apparatus have a respective drive element and are advantageously driven by a common drive shaft by means of a drive motor. This makes it possible to actuate a synchronous lifting movement by virtue of a simultaneous movement of the slotted guides in order to perform the lifting movement.

Furthermore, guides, which guide the carrier apparatus during a lifting movement performed by the lifting apparatus, in the course of which the carrier apparatus is moved in height terms vertically in relation to the base frame, are preferably provided between the base frame and the carrier apparatus. This makes it possible to prevent the workpiece support from turning in relation to the base frame. Moreover, the workpiece support remains aligned in a moving-in and moving-out direction with respect to the machining machine.

The guides preferably consist of at least one round guide held on a carrier support and at least two, preferably three, sliding guides provided on carrier supports, it preferably being the case that the at least one round guide and/or the at least one sliding guide is provided on two mutually opposite outer sides of the carrier apparatus on which the lifting apparatus also engages. The round guide allows the carrier apparatus to be fixed in place in relation to the base frame. The sliding guides, in particular three sliding guides, prevent the carrier apparatus from turning in relation to the base frame.

To actuate the lifting movement, the slotted guide of the lifting apparatus advantageously contains an upper and a lower end portion, each of which is aligned horizontally, and in between them at least one rising curve profile, a slope with self-locking for the lifting movement of the carrier apparatus being provided for the curve profile. The horizontally aligned end portions enable a secure vertical position of the carrier apparatus irrespective of the positioning accuracy of the drive. This in turn makes it possible to save on costs. By virtue of the self-locking slope of the curve profile of the slotted guide, the carrier apparatus stays in position in the event of an emergency stop during the lifting movement.

The horizontal movement of the slotted guide is advantageously delimited on either side by a respective stop, which is preferably provided on the base frame. This prevents the slotted guide from inadvertently being guided out of the carrier rollers and running rollers lying one on top of the other, and the carrier apparatus from falling out of the base frame.

Advantageously, in a final position of the slotted guide in which it bears against the end stop, the drive elements are arranged in a decoupled state in relation to one another. In this respect, the slotted guide is preferably also guided between the carrier rollers and the running rollers. Such taking up of a decoupled position of the drive wheels makes it possible for the changeover apparatus to be stopped automatically in the event of a fault.

Advantageously, between the base frame and the carrier apparatus there is provided a height-adjustable stop, on which the carrier apparatus rests in a lower, or first, lifting position, in which the slotted guide of the lifting apparatus is held without loading between the carrier apparatus and the base frame by the carrier rollers and the running rollers. Such an arrangement allows the slotted guide to be exchanged easily in the event of damage or adaptation to a lifting position with a new working plane or adaptation of the slope of the curve. In this way, the lifting times and/or lifting forces can be altered and can be adapted to different requirements: The flatter the course of the curve is, the less lifting force is required, but at the same time the lifting time increases. If the machining machine, in particular laser machine, is intended to be used to machine only workpieces of a small thickness (thin sheet metal), a steeper course of the curve can therefore be selected, so that the lifting takes place quicker. When machining workpieces with a large thickness, a flatter course of the curve is selected. Additional load lifting means or the like for holding the carrier apparatus are not necessary for changing over the slotted guide in this way.

A preferred development of the slotted guide provides at least one further horizontal end portion in between the upper and the lower horizontal end portion. In the case, for example, of a lower horizontal end portion, a middle horizontal end portion and an upper horizontal end portion, the carrier apparatus can be set to three lifting positions. In such a case, the carrier apparatus can receive three workpiece supports and allow changeover between any of the three workpiece supports.

Similarly, a changeover apparatus according to the invention may have a carrier apparatus for two workpiece supports and a slotted guide with three horizontal end portions. In this respect, the horizontal end portions of the slotted guide can be matched to two transfer planes at different heights. In this way, the same changeover apparatus can be used to operate in two different transfer planes (e.g. the working planes at different heights of two different machining machines, or the working plane of a machining machine, on the one hand, and the loading and unloading plane, which is different therefrom, of a loading and unloading apparatus for loading and unloading the changeover apparatus outside the machining machine, on the other hand).

According to one embodiment, the carrier apparatus has at least two U-shaped longitudinal profiles which are connected to one another, in particular by transverse struts, and form a closed framework, with the open, U-shaped longitudinal profiles being directed toward one another, with the result that each leg of the U-shaped longitudinal profile forms a running surface for a workpiece support mounted on rollers. This in turn provides a cost-effective structure.

Advantageously provided on the base frame are height-adjustable feet, which make it possible to set the working plane and at least one lifting position of the carrier apparatus to a travel track height of the machining machine for moving the workpiece support in and out. This makes it possible to move the workpiece support into the machining machine and out of it again without shocks.

According to a preferred embodiment, the base frame of the changeover apparatus comprises two spaced-apart, U-shaped, preferably upwardly open, lateral carriers, it preferably being the case that one end region is fixedly connected to a basic body of the machining machine by a screwed connection and, at an opposite end region, the lateral carriers are fixedly connected to one another by way of a transverse web or a paneling. This makes it possible to create a direct attachment to the machining machine. Moreover, a rigid—virtually closed—framework can be formed for the base frame. According to an alternative configuration of the base frame, it consists of two individually deployable L-shaped lateral carriers, it preferably being the case in turn that one end region of the base frame is fixedly connected to the basic body of the machining machine by a screwed connection and, at an opposite end region, the lateral carriers are fixedly connected to one another by way of a transverse web or a paneling.

Other features which are considered as characteristic for the invention are set forth in the appended claims.

Although the invention is illustrated and described herein as embodied in a changeover apparatus for changing between at least two workpiece supports for a machining machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The features that can be gathered from the description and the drawings can be used individually by themselves or as a plurality in any combination according to the invention.

BRIEF DESCRIPTION OF THE FIGURES

FIG. 7 is a perspective view of a detail of a guide of the carrier apparatus according to FIG. 2;

FIG. 8 is a perspective view of a further guide of the carrier apparatus according to FIG. 2;

FIG. 9 is a perspective view of an alternative embodiment of the changeover apparatus in relation to FIG. 2;

FIG. 9A is an enlarged, perspective view of a portion of FIG. 9;

DETAILED DESCRIPTION OF THE INVENTION

Figure 1:
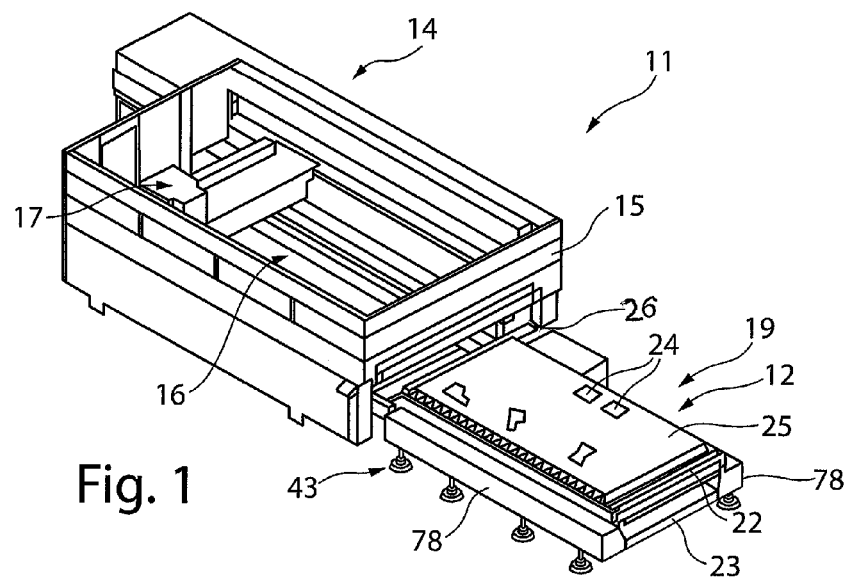
FIG. 1 is a diagrammatic, perspective view of a machining installation with a machining machine and a changeover apparatus according to the invention.

Referring now to the figures of the drawings in detail and first, particularly to FIG. 1 thereof, there is shown a perspective illustration of a machining installation 11 for the cutting machining of plate-shaped materials 12 which consist of metal. The machining installation 11 has a machining machine 14, which is a laser cutting machine in the example shown. The machining machine 14 may alternatively also be a plasma cutting machine or combined punch/laser machine. The machining machine 14 contains an enclosure 15. A machining station 16, in which a cutting unit 17 with at least one laser cutting head can be moved within a horizontal movement plane, is provided inside the enclosure 15.

A loading and unloading station 19 is provided outside the enclosure 15. The loading and unloading station 19 has at least one changeover apparatus 21 for at least two workpiece supports 22, 23. In addition, and not illustrated in more detail, it is possible for the changeover apparatus 21 to be assigned a handling apparatus, which places the plate-shaped material 12 in unmachined form, that is to say in the form of raw material, onto the workpiece support 22 before the workpiece support 22 is moved into the machining station 16. After this, the plate-shaped material 12 is machined in order to produce workpieces 24, in particular parts of acceptable quality. In the process, residual parts or a residual cut-out sheet 25 are also produced at the same time. After moving the workpiece support 21 out of the machining station 16, it is possible to remove the workpieces 24 and/or residual parts or a residual cut-out sheet 25 manually or using the handling device.

The workpiece support 22, 23 is moved in and out through an opening 26 in the enclosure 15. The opening 26 may be closed by a closure element, which is not illustrated in more detail, such as a door or a flap, and is opened during the movement of the workpiece support 22, 23.

Figure 2:
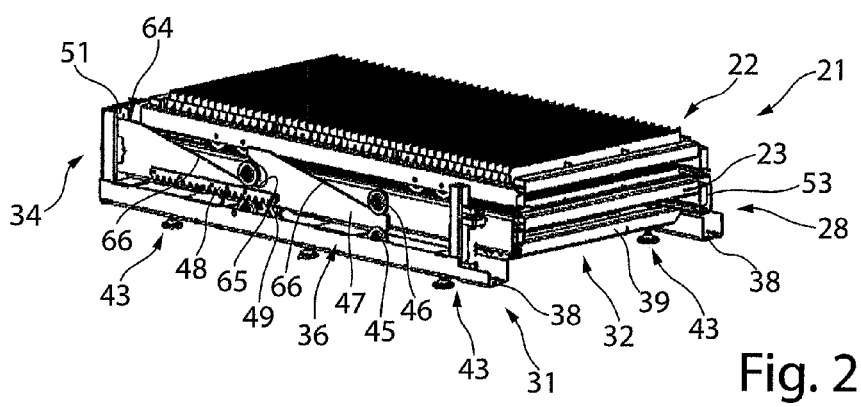
FIG. 2 is a perspective view of the changeover apparatus according to FIG. 1 in a first lifting position.
Figure 3:
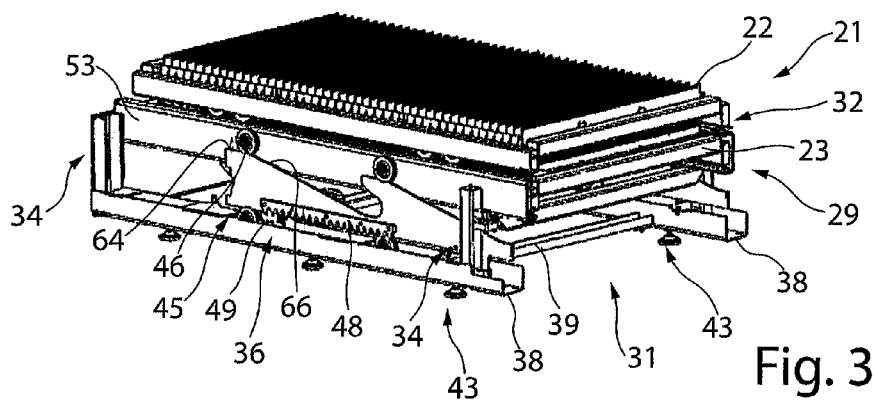
FIG. 3 is a perspective view of the changeover apparatus according to FIG. 2 in a further lifting position.

FIG. 2 illustrates a perspective view of the changeover apparatus 21 in a first lifting position 28. FIG. 3 shows the changeover apparatus 21 in a further lifting position 29. The changeover apparatus 21 has a base frame 31 with a carrier apparatus 32, which can be moved back and forth along guides 34 between the first lifting position 28 and the at least one further lifting position 29. For this lifting movement of the at least two workpiece supports 22, 23 in the carrier apparatus 32, a lifting apparatus 36 is provided, which acts between the base frame 31 and the carrier apparatus 32.

Figure 4:
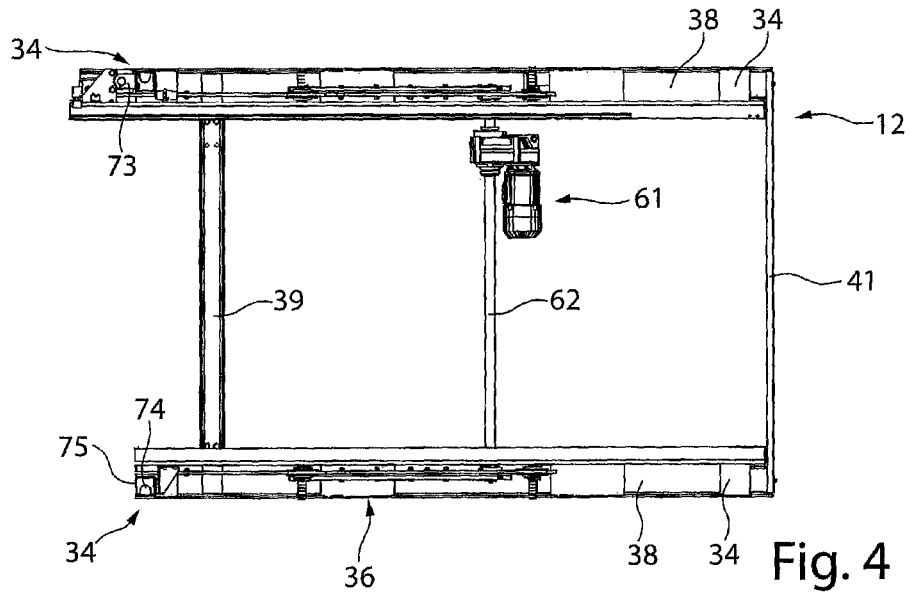
FIG. 4 is a top view of the changeover apparatus with a workpiece support that is not illustrated.

The base frame 31 is formed by two U-shaped lateral carriers 38, which are fixed at a distance from one another by at least one transverse web 39 (FIG. 3) and/or a paneling 41 on the end face (FIG. 4). This makes it possible to form a closed framework. Feet 43 which are settable in height are provided on a bottom side of the lateral carriers 38 in order to align the base frame 31 and/or the workpiece supports 22, 23 in the working plane, so that they can be moved into and out of the machining station 16 without shocks.

The lifting apparatus 36 has at least two carrier rollers 45, which are mounted rotatably on the lateral carrier 38 at a distance from one another. Furthermore, the lifting apparatus 36 has two running rollers 46, which are arranged on the side of the carrier apparatus 32 outside a receiving region of the workpiece supports 22, 23 for receiving the plate-shaped material 12. The carrier rollers 45 and the running rollers 46 preferably each have a guide contour 46a as shown in best in FIG. 9A. A slotted guide 47 is provided between the carrier rollers 45 and the running rollers 46. This slotted guide 47 is plate-shaped and can also be referred to as cam-track plate. The running rollers 46 and carrier rollers 45 each have the guide contour 46a being a U-shaped depression in their respective running surface, in order to guide the slotted guide 47 in an upright arrangement between the carrier rollers 45 and the running rollers 46.

A drive element 48 is furthermore detachably secured to or formed in one piece on the slotted guide 47. The drive element 48 interacts with a complementary drive element 49. This makes it possible to actuate a horizontal movement of the slotted guide 47.

This arrangement formed of the carrier rollers 45, the running rollers 46 and the slotted guide 47 arranged in between is preferably provided on both outer sides of the carrier apparatus 32. This provides a uniform lifting movement and an unobstructed movement of the workpiece supports 22, 23 into and out of the carrier apparatus 32.

When a first lifting position 28 of the changeover apparatus 21 is being taken up, the slotted guide 47 is moved to the left (FIG. 2). In this first lifting position 28, the carrier apparatus 32 is lowered. This first lifting position 28 makes it possible for the upper workpiece support 22 to be arranged in the working position in which it can be moved into and out of the machining machine 14.

The carrier apparatus 32, for example, consists of two open, U-shaped longitudinal profiles 53, which face one another. These longitudinal profiles 53 are preferably spaced apart from one another by transverse struts 54 and form in particular a closed framework. The two parallel legs of the U-shaped longitudinal profile 53 preferably each form a running surface 56, 57 for the workpiece support 22, 23, each workpiece support 22, 23 having rollers for the movable arrangement thereof. The height of the longitudinal profile 53 is adapted to the framework height of the workpiece support or its overall height, with the result that the workpiece supports can be received in parallel and one on top of the other in the carrier apparatus 32.

FIG. 3 shows a perspective view of the changeover apparatus 21 according to FIG. 2 in a further lifting position 29. The slotted guide 47 has been moved into a position on the right. As a result, the carrier apparatus 32 is raised with respect to the first lifting position 28 in FIG. 2.

To actuate the lifting movement, a drive 61, in particular an electric motor, with a transmission which drives a drive shaft 62 is provided. This is illustrated in a plan view in FIG. 4. The one complementary drive element 49, in particular a toothed pinion, is preferably provided at the respective end of the drive shaft 62, as a result of which the drive element 48, in particular a toothed rack, that is provided on the slotted guide 47 and is connected fixedly to the slotted guide 47 is driven. The synchronous driving movement of the drive elements 49 makes it possible to initiate a simultaneous movement of the two slotted guides 47, in order to lift or lower the carrier apparatus 32.

According to the embodiment in FIG. 2 and FIG. 3, the lifting apparatus 36 contains a slotted guide with an upper horizontal end portion 64 and a lower horizontal end portion 65, and with a curve profile 66 in between them. As a result, a first lifting position 28, or a lower lifting position, according to FIG. 2 and a further lifting position 29, or an upper lifting position, according to FIG. 3 can be actuable. The curve profile 66 preferably comprises a slope with self-locking, with the result that, in the event of failure of the drive 61, the carrier apparatus 32 is positioned in a self-retaining manner in the position that was last moved to when the drive 61 came to a standstill. This provides a safety function against inadvertent lowering. A transition region with a gentler slope is preferably provided between the upper end portion 64 and the curve profile 66 and/or between the lower end portion 65 and the curve profile 66 for smoothly starting up the lifting and lowering movement.

Figure 5:
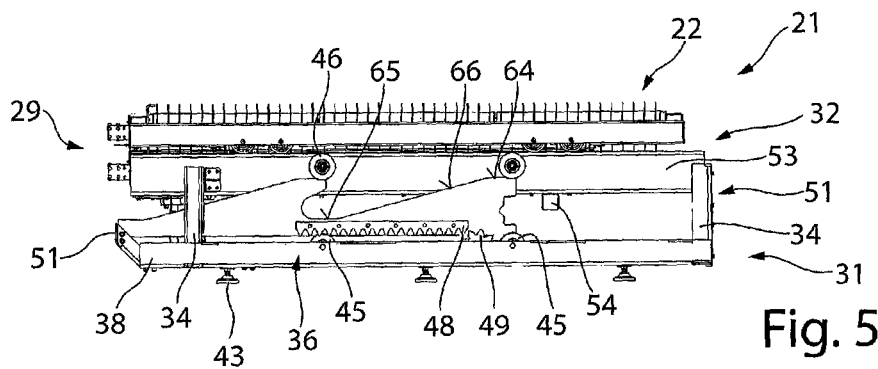
FIG. 5 is a side view of the changeover apparatus according to FIG. 3.

FIG. 5 illustrates a schematic side view of the changeover apparatus 21 according to FIG. 3, the illustration being of an opposite side of the changeover apparatus 21 to that in FIG. 3. The running rollers 46 on the carrier apparatus 32 are preferably above the carrier rollers 45 secured to the base frame 31. This makes it possible to provide an optimum load dissipation when the carrier apparatus 32 is being lifted and lowered. Actuation of the slotted guide 47 with attendant tolerances may be provided by the upper and the lower horizontal end portion 64, 65 for the purpose of taking up the first lifting position 28 and the further lifting position 29.

The slotted guide 47 of the lifting apparatus 36 is illustrated in an end position on the left, in which the stop 51 prevents movement to the left or the slotted guide 47 bears against the stop 51. On the opposite side, a further stop 51 is provided. In this position of the slotted guide 47, in which the slotted guide 47 bears against the right-hand or left-hand stop 51, the drive element 49 is not in engagement with the drive element 48. This involves a fault scenario, in the event of which it is ensured, however, that the carrier apparatus 32 is not inadvertently lowered. For further startup, the slotted guide 47 can be displaced to the right or left again, with the result that the drive elements 48, 49 engage on one another again in order to actuate a lifting movement.

Figure 6:
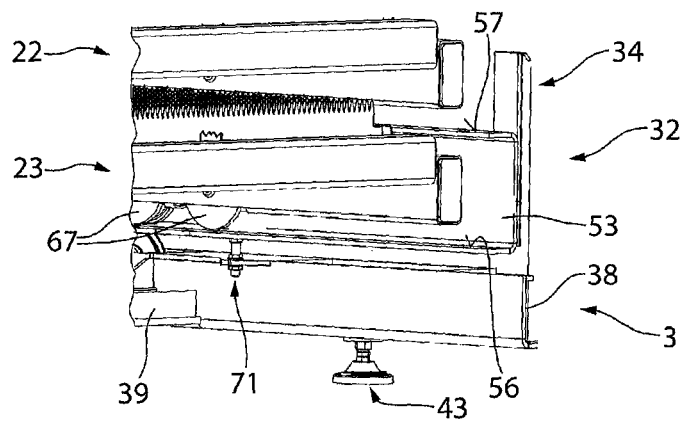
FIG. 6 is a schematic view of a detail of a base frame and a carrier apparatus of the changeover apparatus.

FIG. 6 illustrates a partial perspective view of the base frame 31 and the carrier apparatus 32. It is clear from this figure that the workpiece support 22, 23 is mounted on rollers 67, which rest on the running surface 56 of the longitudinal profile 53 of the carrier apparatus 32. In addition, a preferably height-adjustable stop 71, which makes it possible to set the lowest height to which it is possible to lower the carrier apparatus 32 with respect to the base frame 31, is provided on the base frame 31. This stop 71 makes it possible to guide the slotted guide 47 in an arrangement according to FIG. 2 only between the running rollers 46 and carrier rollers 45. The carrier apparatus 32 rests on the stops 71 on the base frame 31. This makes the slotted guide 47 free of loading and makes it possible easily to guide it out between the two carrier rollers 45 and running rollers 46 and to insert a new slotted guide 47.

The carrier apparatus 32 is guided on the base frame 31 by preferably four guides 34. These guides 34 are arranged close to the respective corner region of the workpiece support 22, 23. This is clear from the plan view in FIG. 4.

In this embodiment of the changeover apparatus 21 according to FIGS. 2 to 6, one of the guides 34 is in the form of a round guide 73. Such a round guide 73 is illustrated in perspective in FIG. 7. The round guide 73 is retained in relation to the lateral carrier 38 of the base frame 31 by a carrier support 76. Such a round guide 73 fixes the carrier apparatus 32 in relation to the base frame 31 with respect to the vertical axis. The further three guides 34 are in the form of a sliding guide 74, which is illustrated in FIG. 8. In this respect, a sliding surface 75 bears against a carrier support 76, which is secured to the lateral carrier 38 of the base frame 31. Such an arrangement maintains correct positioning of the carrier apparatus 32 in relation to the base frame 31 and prevents them from turning relative to one another.

In the above illustration of the changeover apparatus 21 according to FIGS. 2 and 3, it is possible to provide lateral paneling parts 78, illustrated in FIG. 1, which have been removed in the further figures in order to be able to see the structure and the function of the lifting apparatus 36.

FIG. 9 illustrates a perspective side view of the changeover apparatus 21 with an alternative embodiment of the lifting apparatus 36 in relation to FIGS. 2 and 3. In the case of this lifting apparatus 36, by contrast to the slotted guide 47 described above, it is provided that a further horizontal portion 68 is provided between the upper end portion 64 and the lower end portion 65. This makes it possible to transport the carrier apparatus 32 to a first lifting position 28, to a middle lifting position owing to the horizontal portion 68, and to an upper lifting position 29 by virtue of the upper end portion 64. The carrier apparatus 32 preferably has two longitudinal profiles 53 arranged one on top of the other, in order to receive three workpiece supports 22, 23, 69. It will be understood that the number of workpiece supports may be increased correspondingly when the slotted guide 47 is configured with further horizontal portions between the end portions 64, 65. In all other respects, the statements and advantageous configurations relating to the above-described embodiments according to FIGS. 1 to 8 apply.

Figure 10:
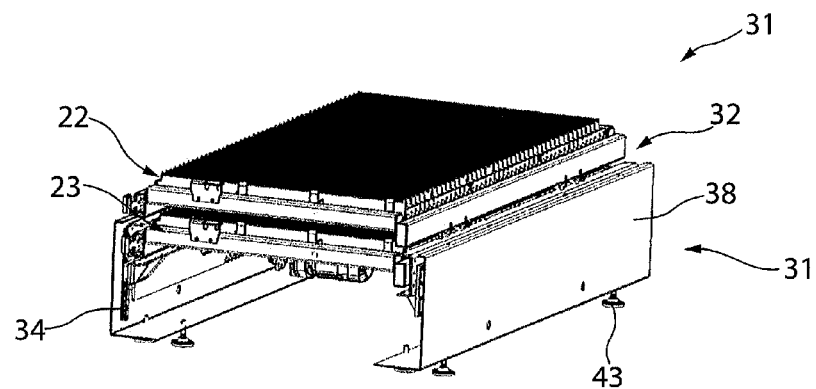
FIG. 10 is a perspective view of a further alternative embodiment of the changeover apparatus in relation to FIG. 2.

FIG. 10 illustrates a perspective view of an alternative embodiment of the changeover apparatus 21 in relation to FIGS. 2 and 3. In this embodiment, the base frame 31 has a different form to the embodiment according to FIGS. 2 and 3. In the present embodiment, the base frame 31 consists of two, preferably L-shaped, lateral carriers 38 that are arranged symmetrically in relation to one another. These lateral carriers 38 are preferably self-supporting.

Guides 34, along which the carrier apparatus 32 can be moved back and forth, are provided on the respective inner sides of the vertical portions of the L-shaped lateral carriers 38. The carrier apparatus 32, the lifting apparatus 36 and the drive 61 with the drive shaft 62 correspond to the above-described embodiments of FIGS. 1 to 9.

These lateral carriers 38 may be connected to one another at an end portion by a transverse web or a paneling 41 analogously to FIG. 4. At the opposite end region, the L-shaped lateral carriers 38 are connected, in particular screwed, to a basic body of the machining machine 14.

Figure 11:
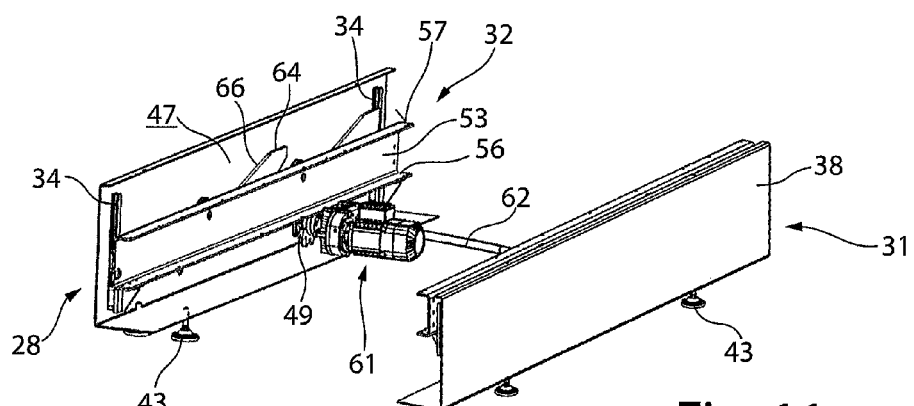
FIG. 11 is a perspective view of the base frame and the carrier apparatus in a first lifting position as per the changeover apparatus in FIG. 10.

FIG. 11 illustrates a perspective view of the base frame 31 with the carrier apparatus 32 according to FIG. 10, the workpiece supports 22, 23 not being illustrated for the sake of preserving clarity. The longitudinal profiles 53 of the carrier apparatus 32 are provided in a first lifting position 28. In this embodiment of the base frame 31, the transverse struts 54 extending between the longitudinal profiles 53 of the carrier apparatus 32 can be omitted.

Figure 12:
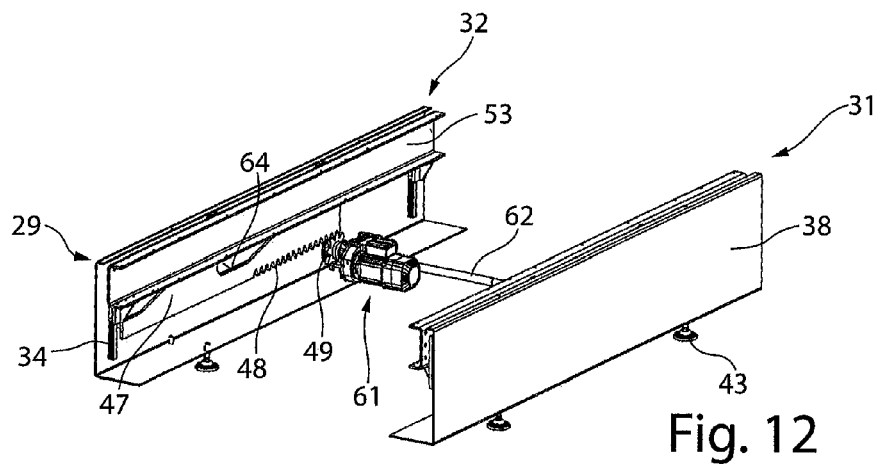
FIG. 12 is a perspective view of the base frame and the carrier apparatus in a further lifting position of the changeover apparatus according to FIG. 10.

FIG. 12 illustrates the changeover apparatus 21 analogously to FIG. 11, the longitudinal profiles 53 of the carrier apparatus 32 having been moved to a further lifting position 29, or an upper lifting position 29. he lifting movement is actuated and performed as in the changeover apparatus 21 according to FIGS. 2 and 3.

In this changeover apparatus 21 according to FIGS. 10 to 12, the guides 34 are in the form of a linear guide or longitudinal guide, for example, it preferably being the case that two, preferably identical, guides 34 are provided on each lateral carrier 38. The guides 34 are secured to the lateral carriers 38 at a distance from one another, with the result that the slotted guide 47 is horizontally movable between them. A stop 51 for delimiting the movement travel of the slotted guide 47 over which the drive elements 48, 49 are not in engagement may also be provided between a respective end of the movement travel of the slotted guide 47 and the respectively assigned guide 34.

The invention claimed is:

1. A changeover apparatus for changing between at least two workpiece supports for a machining machine, the changeover apparatus comprising:
    a base frame having a carrier apparatus for the at least two workpiece supports being vertically movable by said carrier apparatus, with a result that one of the workpiece supports is transferred into a working plane in which the one workpiece support is moved from said carrier apparatus into the machining machine and guided out therefrom;
    a lifting apparatus acting between said base frame and said carrier apparatus and by way of which said carrier apparatus is moved vertically relative to said base frame in order for a respective one of the workpiece supports to take up a first lifting position or at least one further lifting position in the working plane, said lifting apparatus containing at least one slotted guide, which is horizontally movable and movably actuates said carrier apparatus with the at least two workpiece supports together between the first lifting position and the at least one further lifting position in relation to said base frame;
    at least two carrier rollers disposed on said base frame;
    at least two running rollers disposed on said carrier apparatus; and
    said at least one slotted guide is a plate-shaped slotted guide and is movably guided between said at least two carrier rollers disposed on said the base frame and said at least two running rollers disposed on said carrier apparatus; and
    said at least two carrier rollers and said at least two running rollers each have a running surface with a guide contour formed therein which guides said plate-shaped slotted guide between said at least two carrier rollers and said at least two running rollers.

2. The changeover apparatus according to claim 1, wherein said lifting apparatus with said at least one slotted guide is provided on either side of said carrier apparatus.

3. The changeover apparatus according to claim 1, wherein said at least two carrier rollers are mounted rotatably to said base frame further comprising at least two carrier rollers disposed on said base frame.

4. The changeover apparatus according to claim 1, wherein said at least two carrier rollers and said at least two running rollers are disposed perpendicularly with respect to a movement direction of said at least one slotted guide in a common plane.

5. The changeover apparatus according to claim 1, further comprising:
    a complementary drive element;
    a drive motor; and
    a drive element, interacting with said complementary drive element, is disposed on said at least one slotted guide of said lifting apparatus, one of said drive element and said complementary drive element are actuated by said drive motor.

6. The changeover apparatus according to claim 5,
    further comprises a common drive shaft; and
    wherein said at least one slotted guide is one of a plurality of slotted guides, said slotted guides are disposed on either side of said carrier apparatus and are each movably actuated by said complementary drive element, on said complementary drive element said common drive shaft engages, and said common drive shaft is driven by said complementary drive motor.

7. The changeover apparatus according to claim 5, wherein said at least one slotted guide of said lifting apparatus has an upper end portion and a lower end portion, which run horizontally and have a rising curve profile in between them, which has a slope with self-locking for a lifting movement of said carrier apparatus.

8. The changeover apparatus according to claim 7, further comprising end stops, wherein a horizontal movement of said at least one slotted guide is delimited on either side by a respective one of said end stops.

9. The changeover apparatus according to claim 8, wherein said drive element of said at least one slotted guide is decoupled from said complementary drive element if said at least one slotted guide by way of one of said upper or lower end portions bears against one of said end stops.

10. The changeover apparatus according to claim 7, wherein said at least one slotted guide has at least one further horizontal end portion between said upper and said lower end portions and, in between them, a respective curve profile is provided, and said carrier apparatus receives a number of the workpiece supports corresponding to a number of said upper end portion, said lower end portion and said at least one further horizontal end portion.

11. The changeover apparatus according to claim 5, wherein said complementary drive element is in a form of a drive pinion, said drive element is disposed on said at least one slotted guide being in a form of a toothed rack, which is driven by said complementary drive element.

12. The changeover apparatus according to claim 1, further comprising a height-adjustable stop disposed between said base frame and said carrier apparatus, on said height-adjustable stop said carrier apparatus rests in the first lifting position, in which said at least one slotted guide is held without loading between said carrier apparatus and said base frame by said at least two carrier rollers and said at least two running rollers.

13. The changeover apparatus according to claim 1, further comprising guides for guiding said carrier apparatus vertically in height terms movably in relation to said base frame, said guides are disposed between said base frame and said carrier apparatus.

14. The changeover apparatus according to claim 13, wherein said guides are linear guides or said guides are in a form of at least one round guide and at least two sliding guides.

15. The changeover apparatus according to claim 1, wherein said carrier apparatus has at least two U-shaped longitudinal profiles with open sides which face one another and legs wherein each of said legs of said U-shaped longitudinal profile form a running surface for the workpiece supports mounted on rollers.

16. The changeover apparatus according to claim 1, further comprising height-adjustable feet disposed on said base frame, said height-adjustable feet make it possible to set the working plane in the first lifting position or the at least one further lifting position to a travel track height of the machining machine for moving the workpiece support in and guiding it out.

17. The changeover apparatus according to claim 1, wherein said base frame contains two individually deployable L-shaped lateral carriers or two spaced-apart, U-shaped lateral carriers.

18. The changeover apparatus according to claim 1, wherein said guide contour is a U-shaped guide contour or groove-shaped guide contour.

19. The changeover apparatus according to claim 1, wherein said at least two carrier rollers and said at least two running rollers are disposed perpendicularly with respect to a movement direction of said at least one slotted guide in a common plane and have a lateral position deviation perpendicularly with respect to a movement direction of said at least one slotted guide of less than 1 mm.

* * * * *